Mar. 27, 1923.

Re. 15,567

M. G. MAJOR

LETTER SHEET

Original Filed July 22, 1921 2 sheets-sheet 1

Inventor
Malcolm G. Major

By Dwight B. Gates

Attorney

Mar. 27, 1923.

Re. 15,567

M. G. MAJOR

LETTER SHEET

Original Filed July 22, 1921 2 sheets-sheet 2

Inventor
Malcolm G. Major

By Dwight B. Gill.
his Attorney

Reissued Mar. 27, 1923.

Re. 15,567

UNITED STATES PATENT OFFICE.

MALCOLM G. MAJOR, OF WASHINGTON, DISTRICT OF COLUMBIA, ASSIGNOR TO ADVERTISERS' ART STUDIOS, INC., OF WASHINGTON, DISTRICT OF COLUMBIA.

LETTER SHEET.

Original No. 1,428,503, dated September 5, 1922, Serial No. 486,767, filed July 22, 1921. Application for reissue filed November 29, 1922. Serial No. 604,092.

*To all whom it may concern:*

Be it known that I, MALCOLM G. MAJOR, a citizen of the United States, residing at Washington, District of Columbia, have invented certain new and useful Improvements in Letter Sheets, of which the following is a specification.

This invention relates to letter sheets, and has for its object to provide a device of this character particularly adapted for use in connection with advertising matter, which advertising matter may be displayed within the sheet, and then the sheet folded into a compact package, and held folded so that the same may be mailed. A feature of the invention is to provide the sheet with detachable coupons which may be returned by the addressee for information, or as a coupon for special premiums.

A further object is to provide a letter sheet substantially square, said sheet being provided with detachable triangular shaped coupons at the opposite corners thereof, and a plurality of parallel disposed scored lines on which the various parts fold, said lines being interposed between the detachable coupons and in parallel relation to the adjacent sides thereof, thereby forming spaces for displaying purposes. The invention further consists in the provision of a letter sheet having vertically disposed lines at right angles to parallel lines, and extending from the corners of the triangularly shaped coupons and forming lines on which the outwardly extending opposite triangular portions of the sheet may be folded inwardly during the folding operation of the sheet.

A further object is to provide one of the triangular shaped detachable coupons with means whereby the coupon end may be received and locked in a slot located centrally of the sheet for holding the sheet in folded condition, which means may include a notch disposed in an edge of the coupon.

A still further and particular object of the invention is to provide a letter sheet foldable in such manner as to have the appearance of an envelop, and wherein the securing flap thereof may be sealed or permanently attached to the body of the sheet, and yet the inner portions or surfaces of the sheet may be readily viewed or inspected without unfolding the sheet, breaking the sealed flap, or tearing any part of the sheet. By this particular method of folding and sealing the sheet, the same may be mailed other than as first class mail matter.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
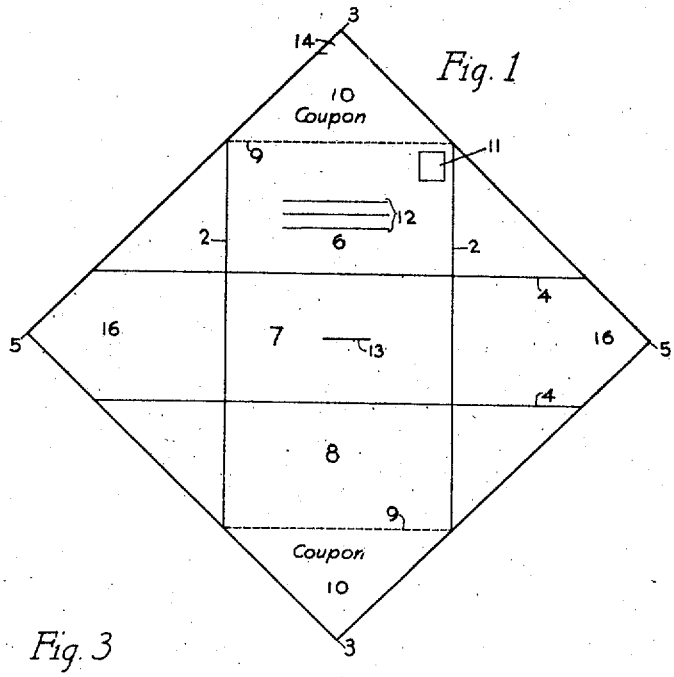
Figure 1 is a plan view of the outside of the letter sheet showing the same in open condition.
Figure 3:
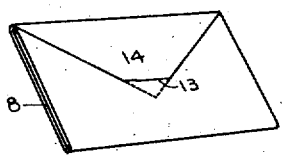
Figure 3 is a perspective showing the letter sheet folded.

Referring to the drawings, the numeral 1 designates a rectangular shaped piece of paper preferably square, which rectangular shaped piece of paper on its outside is provided with lines 2 vertically disposed and in parallel relation to each other, each of said lines being equally distant from a center line drawn between the opposite corners 3 of the sheet 1, said lines 2 being intersected by spaced lines 4 equally distant on each side of the line drawn between the corners 5 of the sheet 1. It will be seen that oblong shaped sections or panels 6, 7 and 8 are formed by the lines 2 and 4 and by the scored lines 9, which form the triangular shaped detachable coupon sections or flaps 10, and on the inside faces of the sections 6, 7 and 8 various advertising matter may be disposed or pictorial views if desired. The outside of the section 6 is provided with a space 11 for a stamp and a plurality of lines for the name and address of the addressee. The section 7 at a point substantially centrally thereof is provided with a slot 13, which slot when the device is folded as shown in Figure 3 receives the point 14 of one of the detachable flaps or coupons 10, and forms means whereby the letter sheet may be maintained in folded position. If so desired the point 14 of the coupon 10 may be provided with a coating of gum 15 whereby the sheet may be sealed in closed position. When the adhesive is used to secure the coupon, the point 14 will not be inserted in slit 13, but will be adhered to the outer face of the panel 7, as will be obvious.

Figure 2:
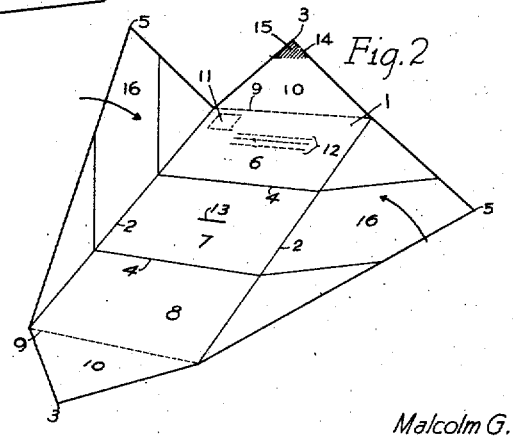
Figure 2 is a perspective view of the sheet showing the inside thereof and the sheet ready to be folded.
Figure 4:
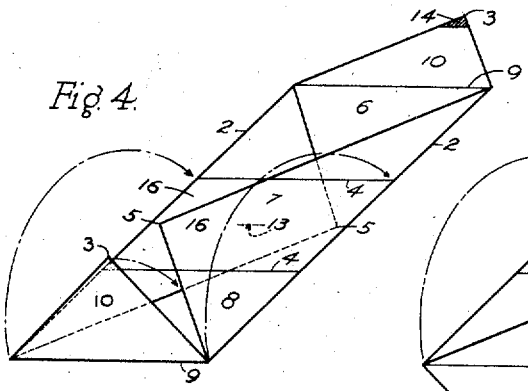
Figures 4 and 5 show initial steps, after the corner members have been folded inwardly, in folding the blank into envelop form.
Figure 5:
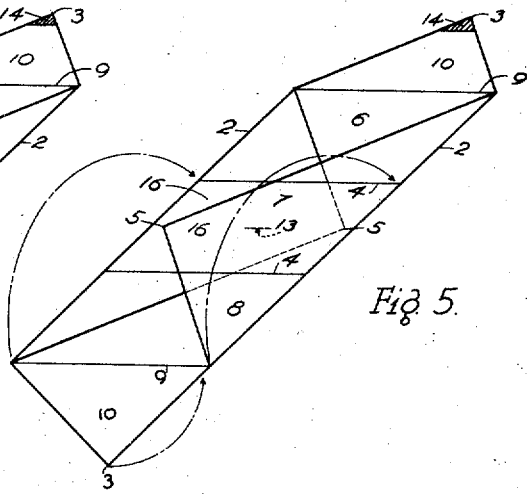
Figure 6:
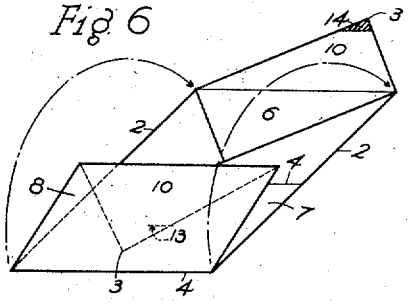
Figures 6 and 7 show the next successive steps in folding the panels of the blank.
Figure 7:
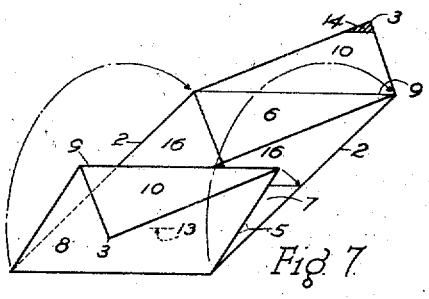
Figure 8:
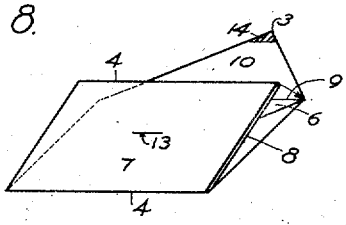
Figure 8 is a view showing the folding completed all but folding the securing flap and securing the same to the back of the central panel.

By providing the coupons, return addresses may be obtained, or special offers made upon presentation of one of the coupons used for other advertising purposes. When it is desired to fold the sheet the triangular shaped corner portions 16 are folded inwardly on the lines 2 as clearly shown in Figure 2, said portions 16 being folded inwardly onto the inner faces of the sections 6, 7 and 8. After the portions 16 have been folded inwardly the lower coupon section 10 is either folded under, as shown in Figs. 5 and 7, or inwardly, as shown in Figs. 4 and 6, and the section 8 folded upwardly on the lower scored line 4 and then on the next scored line 4. This will bring the outer side of the section 7 outwardly and allow the securing point 14 to be inserted in the slot 13 for securing the sheet in folded position.

By folding the sheet in this manner, the inner portions or surfaces of the folded sheet may be viewed or inspected without detaching, breaking or deranging the securing flap, and without injuring any other part of the sheet. This inspection is accomplished by exerting slight pressure upon the longitudinal edges of the folded sheet toward each other, whereupon the "envelop" will be bowed so as to expose certain of the folded inner portions, panels or coupons. Those inner portions not visible by this operation may be brought to view by being partly withdrawn from the packet or "envelop"; a slight twisting action upon such portions being helpful in the attainment of this end. As this twisting movement is exerted only upon the innermost folded portions of the sheet, and as none of these parts are interlocked with each other, no damaging strain will be imparted to the securing flap or outer portions of the folded sheet. The parts withdrawn from the "envelop" in this manner may be easily and quickly returned to their proper folded positions by a reverse twisting movement, and the "envelop" at once assumes its original folded form and appearance.

From the above it will be seen that a letter sheet is provided which is particularly adapted for advertising purposes or for pictures, for instance views of a city. It will also be seen that the sheet is simply made and the interior thereof is so divided as to folds and sections that its entire surface may be utilized for advertising purposes. It will also be seen that detachable triangular shaped coupons are provided for return purposes and that one of said coupons forms securing means for holding the sheet in folded position.

The invention having been set forth what is claimed as new and useful is:

1. A foldable letter sheet comprising a square sheet of paper, a plurality of scored lines on said sheet, disposed horizontally and at forty-five degrees to the side of the sheet, a plurality of lines vertically disposed at forty-five degrees to the side of the sheet and intersecting the horizontally disposed lines at righ angles, horizontally disposed perforated lines connecting the upper ends of the vertically disposed scored lines thereby forming triangular shaped detachable coupons, a horizontally disposed slot located substantially centrally of the sheet, and means whereby one of said coupons when the sheet is folded upon itself will be received and held in said centrally disposed slot.

2. A foldable letter sheet comprising a square sheet of material, said material being provided with pairs of vertically and horizontally disposed spaced parallel lines, the lines of each pair being disposed at equal distances from lines drawn between the corners of the sheet, horizontally disposed perforated lines connecting the ends of the vertically disposed lines thereby forming detachable triangular shaped coupons and means whereby one of the corners of one of the coupons, when the sheet is folded, may be secured to the centrally disposed section of the sheet formed by the scored lines.

3. A letter sheet comprising a square blank having central, upper and lower panel sections of the same dimensions, coupon sections at the top and bottom respectively of the upper and lower sections, corner portions flanking the central, upper and lower sections, and the said central section having a slit disposed centrally thereof and parallel with the adjoining edges of the central and upper and lower sections.

4. A letter sheet comprising a blank having panels, corner members and flaps, so folded as to enable one of the flaps to be permanently secured to a part of said sheet and permitting all portions of the sheet to be viewed by being partially withdrawn from the folded pack or envelop and returned thereto without unfolding the same or detaching or breaking said secured portion.

5. A letter sheet comprising a blank having a series of parallel panels foldable upon each other, corner members flanking said panels, and coupons on the outer edges of the end panels; the blank adapted to be folded by first folding the corner members inwardly upon the inner faces of the panels, folding the coupon of one end panel upon the latter, then folding the panels upon each other successively from one end to the other of the blank, passing the coupon of the last folded panel over upon a reverse surface of the next adjacent panel, and securing said coupon to the said panel.

6. A letter sheet comprising a blank having central, upper and lower panels arranged in parallel relation, flaps at the outer edges of the upper and lower panels respectively, corner members flanking said central, upper and lower panels; the said blank adapted to be folded by bending said corner flaps inwardly upon the faces of said panels, bending the flap of the lower panel upon the panel to which it is attached, then folding the panels successively upon each other from the lower to the upper end of the blank, passing the flap of the upper panel over upon the reverse side of the central panel, and securing said flap to said panel.

7. A letter sheet comprising a blank having a series of panels disposed inwardly from the top, bottom and sides of the sheet, flaps at the outer extremities of the end panels of said series, corner portions flanking said series of panels; the said blank adapted to be folded by bending the said corner portions inwardly upon said series of panels at their juncture with the latter, folding one of said flaps backwardly upon its adjacent panel at the line of juncture thereof, then folding the said panel and flap inwardly upon the next adjacent panel, then folding the remaining panel over upon the parts thus folded and extending the other flap over the folded panels and securing the same to the panel lying directly under the same.

In testimony whereof I hereby affix my signature.

MALCOLM G. MAJOR.